Nov. 24, 1953   H. K. SCHILLING   2,660,469
EGG LIFTER
Filed Nov. 10, 1949   2 Sheets-Sheet 1

Inventor
Hugh K. Schilling
By Robert M. Dunning
Attorney

Nov. 24, 1953
H. K. SCHILLING
2,660,469
EGG LIFTER
Filed Nov. 10, 1949
2 Sheets-Sheet 2
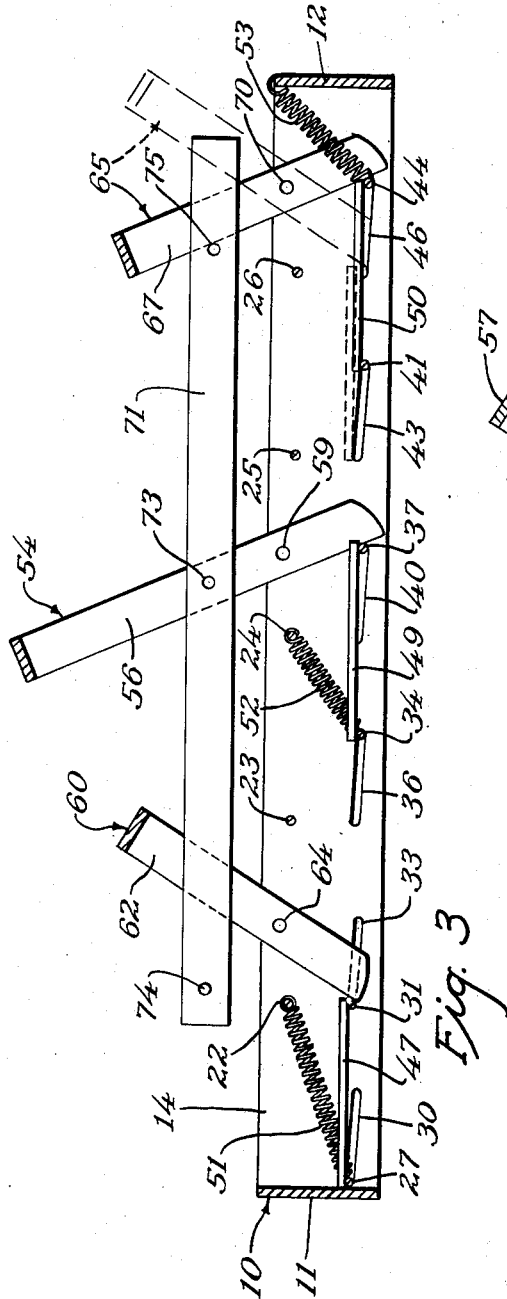
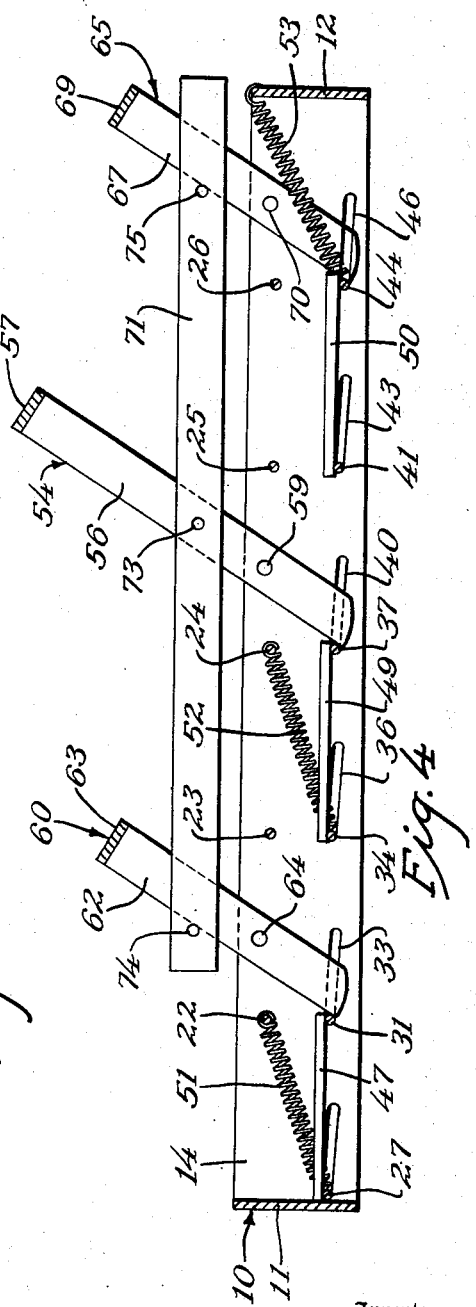
Inventor
Hugh K. Schilling
By Robert M. Dunning
Attorney Patented Nov. 24, 1953

2,660,469

UNITED STATES PATENT OFFICE 2,660,469

EGG LIFTER

Hugh K. Schilling, St. Paul, Minn.

Application November 10, 1949, Serial No. 126,577

13 Claims. (Cl. 294—87.26)

My invention relates to an improvement in egg lifter wherein it is desired to provide a device capable of lifting a multiplicity of eggs for transferring them to a different location.

Eggs are usually packed in egg cases having two separate compartments, each holding fifteen dozen eggs. The eggs are usually packed in tiers with three dozen eggs on each tier in each compartment. The eggs are usually held in properly spaced relation by a suitable filler and are usually separated into layers by suitable flats, which preferably are indented so as to hold the egg in a predetermined location. The present device is designed to engage the three dozen eggs of each layer and to support the eggs during transfer from the egg case to a different location.

It is an object of the present invention to provide a novel means for releasing the eggs. The eggs are usually supported in spaced relation during transfer from one location to another. Means is provided so that a certain proportion of the eggs may be discharged from the holder without discharging all of the eggs.

A feature of the present invention lies in the provision of a carrier capable of lifting and supporting a plurality of eggs such as for example three dozen eggs and in permitting the discharge of a lesser number of eggs, as for example one dozen eggs. As a result my lifter may be actuated to lift up the entire layer of eggs from an egg case and to deposit the eggs into smaller cartons or containers capable of supporting a dozen eggs. My lifter is so designed that each dozen eggs may be separately discharged into a suitable individual carton or container.

A feature of the present invention lies in the provision of an egg lifter which is capable of lifting a considerable number of eggs and in providing a discharge mechanism which may be actuated to release all of the eggs simultaneously therefrom, or which may be actuated to release a predetermined proportion of the eggs. For example if my lifter is designed to lift three dozen eggs, the eggs may be discharged in unison therefrom, or may be released in single dozen lots. If preferred my device may also be actuated to release a first dozen of eggs simultaneously and the remaining two dozen eggs simultaneously. If preferred two dozen eggs may be discharged at one time and the remaining dozen may be later discharged.

A feature of the present invention lies in the provision of an egg lifter comprising a frame of proper size to encompass the eggs to be lifted and including partition forming elements designed to divide the eggs lifted into a plurality of separate compartments. The compartments are provided with slidably supported bottom wires which move from open position to carton bottom closing position. The bottom closures are connected for separation in unison if desired, or certain of the bottom closure members may be individually operated if desired.

These and other objects and novel features of my invention will be more clearly and fully set forth in the following specification and claims.

In the drawings forming a part of my specification:

Figure 3 is a sectional view through the egg lifter showing a portion of the compartments in open position and the remaining compartments in closed position.

Figure 4 is a sectional view through the egg lifter showing the compartments in open position.

Figure 1:
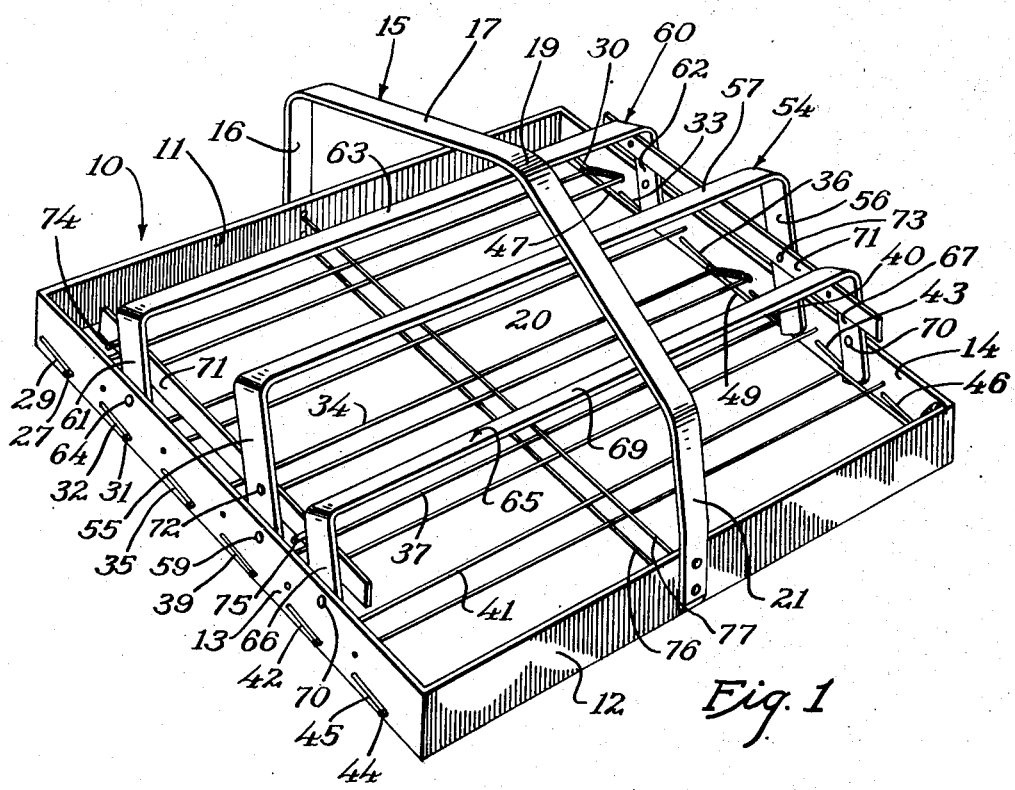
Figure 1 is a perspective view of my egg lifter showing the construction thereof.

The general form of construction of my device is best illustrated in Figure 1 of the drawings. The lifter includes a rectangular frame 10 having opposed parallel ends 11 and 12 and opposed parallel sides 13 and 14. The sides and ends are formed of any suitable material and are preferably sufficiently high to enclose the eggs being lifted and sufficiently thin so that the lifter may be inserted into an egg case of normal size. The egg lifter is provided with a handle 15 by means of which the structure may be manipulated. The handle is connected to the wall 11 and extends upwardly therefrom as indicated at 16. The handle inclines upwardly as indicated at 17 to an intermediate apex 19. The handle then inclines downwardly as indicated at 20 to a point above the end wall 12. The handle then extends downwardly as indicated at 20 and is secured to the end wall 12 by rivets or other suitable means. This handle shape is of importance only because of its convenience and may be varied if desired.

The egg lifter illustrated is designed to enclose three dozen eggs. Accordingly the rectangular frame 10 is divided between its end walls 10 and 11 into six elongated sections by means of partition wires 22, 23, 24, 25, and 26 which are anchored to the side walls 13 and 14 and extend therebetween in parallel relation and in parallel relation to the end walls 11 and 12. The partition wires are preferably spaced substantially from the lower edge of the side walls and are arranged to extend between the eggs being lifted and to hold them in substantial alignment.

A movable partition wire 27 is slidably supported in slots 29 and 30 in the side walls 13 and 14 respectively. The slots 29 and 30 are located near the lower edge of the side walls 13 and 14 and extend from a point substantially mid-way between the partition wire 22 and the end wall 11 to a point in close proximity to the end wall 11. As a result the partition wire 27 may slide from a position substantially midway across the bottom of the first section to a point near the frame end wall 11.

A second partition wire 31 is slidably supported in parallel slots 32 and 33 in the side walls 13 and 14 respectively. The slots 32 and 33 extend from a point midway between the partition wires 22 and 23 to a point beneath the partition wire 22. In one position the partition wire 31 may act as a bottom or floor for the section partition wires 22 and 23, and in another position is vertically aligned with the partition wire 22 so as to leave this section open.

A third slidable partition member 34 is slidably supported in a pair of parallel slots 35 and 36 in the side walls 13 and 14, respectively. The slots 35 and 36 extend from the point midway between the partition wires 23 and 24 to a point beneath the partition wire 23.

A fourth slidable partition wire 37 is slidably supported in parallel slots 39 and 40 in the side walls 13 and 14 respectively. The slots 39 and 40 extend from a point substantially midway between the partition wires 24 and 25 to a point beneath the partition wire 24.

A fifth slidable partition wire 41 is slidably supported in slots 42 and 43 in the side walls 13 and 14. The slots 42 and 43 extend from a point substantially midway between the partition wires 25 and 26 to a point beneath the partition wire 25. A sixth slidable partition wire 44 is slidably mounted in slots 45 and 46 in the end walls 13 and 14. The slots 45 and 46 extend from a point substantially mid-way between the partition wire 26 and the end wall 12 to a point beneath the partition wire 26.

The slidable partition wires 27 and 31 are connected for movement in unison by means of connecting links 47 located closely adjacent to the side walls 13 and 14. The links 47 are secured in fixed relation to the partition wires and form a fixed connection so that both of these slidable partition wires slide in unison.

The partition wires 34 and 37 are similarly connected by connecting links 49 which are spot welded or otherwise connected to these partition members near the side walls 13 and 14. The slidable partition wires 41 and 44 are similarly connected by fixed links 50 which cause these elements to move in unison.

Springs 51 connect each end of the slidable partition wire 27 to the fixed partition wire 22. This spring 51 urges the slidable partition wires 27 and 31 into staggered relationship with the partition wires 22 and 23 so as to normally form a bottom closure for the lifter sections. A spring 52 also connects the fixed partition wire 24 to each end of the slidable partition wire 34 to urge the partition wires 34 and 37 into staggered relation to the fixed partition wires 23, 24, and 25.

A third spring 53 tends to normally urge the slidable partition wires 41 and 44 into staggered relation with the fixed partition wires 25 and 26.

Means are provided for moving the slidable partition wires into vertical alignment with their corresponding fixed partition members so as to open the bottom of the carrier. An inverted U-shaped handle 54 is provided with a pair of parallel arms 55 and 56 connected by a cross connecting member 57. The arms 55 are connected along aligned pivots 59 to the side walls 13 and 14. The ends of the arms 55 and 56 bear against the slidable partition member 37. By pivoting the handle 54 in a clockwise direction about its pivot 59 the lower ends of the arms 55 and 56 are urged against the slidable partition member 37, sliding this slidable partition member and its connected partition member 34 into vertical alignment with the fixed partition wires 24 and 23 respectively.

A second operating handle 60 includes a pair of parallel arms 61 and 62 and a connecting member 63. The arms 61 and 62 are pivotally connected along aligned pivots 64 to the side walls 13 and 14. The lower ends of the arms 61 and 62 engage against the slidable partition member 31. Upon pivotal movement of the operating handle 60 in a clockwise direction, as viewed in the drawings, the partition wire 31 is moved beneath the fixed partition member 22 and the slidable partition wire 27 is moved closely adjacent to the lifter end wall 11.

A similar operating handle 65 includes a pair of parallel arms 66 and 67 and a connecting member 69. The arms 66 and 67 are pivotally connected along aligned pivots 70 to the side walls 13 and 14. The lower ends of the arms 66 and 67 engage against the slidable partition member 41, moving the partition wire 41 and the connected partition wire 44 into vertical alignment with the partition wires 25 and 26 respectively.

A link 71 is pivotally connected to each arm of the operating handle 54. One arm 71 is pivotally connected to the arm 55 by a pivot 72 while the other arm 56 is connected to a second arm 71 along an aligned pivot 73. The arms 71 extend parallel to the side frames 13 and 14 and through the operating handles 60 and 65. A pin or lug 74 near one end of each arm 71 is designed to extend against a corresponding arm 61 or 62 of the handle unit 60. Pins 75 are provided near the other ends of the arms 71 for engagement against the operating handle 65.

In order to further brace the lifter, additional partition wires may be provided at right angles to the partition wires previously described. For example, vertically spaced partition wires 76 and 77 may extend between the frame end walls 11 and 12 intermediate between the side walls 13 and 14 so as to hold the frame in proper relation and to divide the transverse sections into two halves. The partition wires 76 and 77 may also serve to reinforce the various partition wires and particularly the movable partition wires when they are in their lowermost position.

The various slots 29, 30, 32, 33, 35, 36, 39, 40, 42, 43, 45 and 46 preferably incline slightly to the horizontal, being lowest at the end intermediate the fixed partition wires and being highest at the end beneath the partition wires. This arrangement assists in the closing action of the lifter and has been found advantageous.

In operation the operating handle 54 is pivoted in a clockwise direction as viewed in the drawings. This action acts to move the slidable partition wires 34 and 37 beneath their corresponding partition wires 23 and 24. However, this pivotal action also acts through the arms 71 to pivot both the operating handles 60 and 65 in unison therewith. As a result all of the slidable partition wires are moved beneath a corresponding fixed partition wire, with the exception of the movable partition wire 27 which is moved against the fixed wall 11.

Figure 2:
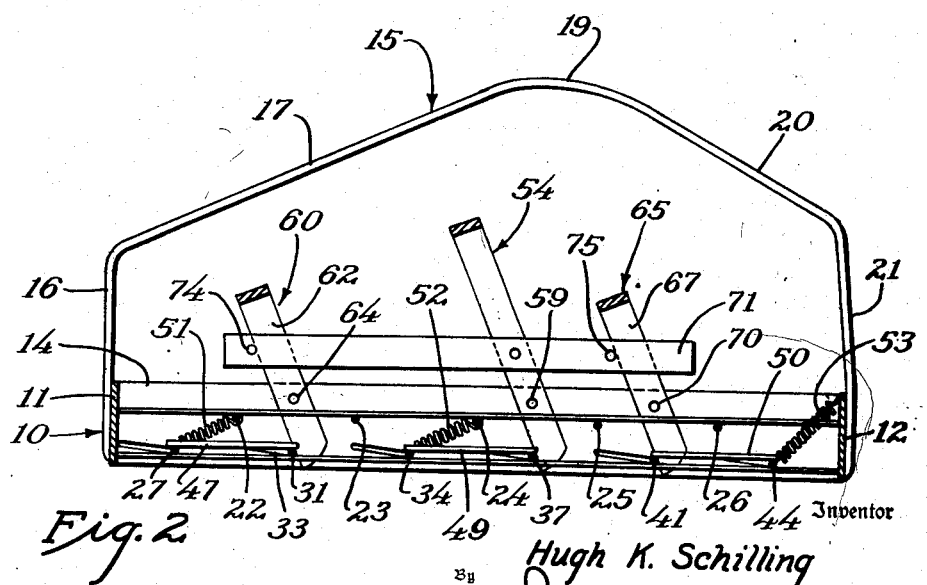
Figure 2 is a sectional view through the lifter illustrated in Figure 1 showing the egg lifter in closed position.

Holding the lifter in this position the lifter is inserted into an egg case so that the various partition wires extend between the eggs thereupon. When the lifter has been inserted to the necessary depth, the pressure holding the operating handle 54 is carefully released, the springs 51, 52, and 53 returning the slidable partition units to section closing position shown in Figure 2 of the drawings. In this position the lower ends of the sections are closed so that the eggs may be lifted.

The lifter is next moved to the location at which the eggs are to be deposited. If all of the eggs are to be simultaneously deposited, the operating handle 54 is again pivoted, which acts through the arm 71 to pivot all of the operating handles in unison and to slide all of the partition members into vertical alignment with corresponding fixed partition members. However, if the eggs are to be deposited into cartons holding a dozen eggs, the lifter is lowered upon the carton so that certain of the eggs are above the carton and a corresponding operating lever is actuated to release only a portion of the eggs. For example if the portion of the lifter to the left of the fixed partition wire 23 is moved above the carton the operating handle 60 may be operated and only a dozen eggs will be deposited into the carton below.

The lifter may next be moved into position above a second carton so that the portion of the lifter to the rear of the fixed partition wire 25 is above the carton. The operating handle 65 may next be actuated to drop the proper eggs into the second carton.

The lifter may then be moved so that the eggs in the center of the lifter between partition wires 23 and 25 are above the third carton. The operating handle 54 may then be actuated to release the remaining eggs into the third carton. When the eggs are deposited into indiivdual cartons, each holding one dozen eggs, it is obvious that the operating handle 54 may be actuated only after the operating handles 60 and 65 have been actuated.

In accordance with the patent statutes, I have described the principles of construction and operation of my egg lifter, and while I have endeavored to set forth the best embodiment thereof, I desire to have it understood that obvious changes may be made within the scope of the following claims without departing from the spirit of my invention.

I claim:

1. An egg lifter including a generally rectangular frame, a series of fixed partition elements secured to extend in parallel relation between opposite sides of said frame and supported thereby, a series of parallel movable partition elements parallel to said fixed partition elements in said frame, means on said frame for supporting said movable partition elements for movement from the position in staggered relation to said fixed partition elements to a position in substantially vertical alignment beneath said fixed partition elements, means engaging certain of said movable partition elements for actuating said certain movable partition elements individually, and means engaging said last named means for moving all of said movable partition elements in unison.

2. The construction described in claim 1 in which the movable partition elements are connected in pairs, the pairs being movable in unison.

3. An egg lifter including a frame, a series of parallel fixed partition forming elements supported by said frame to divide said frame into sections, a series of movable partition elements movably supported by said frame from a position in staggered relation to said fixed partition elements to a position in substantial vertical alignment beneath said fixed partition elements, means for actuating certain of said partition forming elements independently of the others, and means cooperable with said last named means for moving all of said partition forming elements in unison.

4. The construction described in claim 3 and in which the partition forming elements are connected for movement in pairs, certain of said pairs being movable independently of others of said pairs.

5. The construction described in claim 3 and including means for normally urging said movable partition members into staggered relation with said fixed partition members.

6. The construction described in claim 3 and including slots in said frame into which said movable partition elements extend for sliding support.

7. The construction described in claim 3 in which the means for moving the movable partition forming elements includes handle elements engageable with said movable partition elements near opposite ends thereof.

8. The construction described in claim 3 in which the means for moving the movable partition elements comprises a pair of connected arms pivotally supported by said frame for engagement against a movable partition forming element.

9. An egg lifter including a generally rectangular frame, a series of substantially parallel partition forming elements extending across said frame and supported thereby, a series of movably supported partition forming elements slidably supported by said frame in parallel relation beneath said first named partition forming elements, means connecting said movable partition forming elements in pairs, each pair being individually movable, and means for individually moving the partition forming elements of each pair.

10. The construction described in claim 9 in which the moving means includes an inverted U-shaped lever having its ends pivoted on aligned pivots to opposite sides of said frame, the ends of said U-shaped lever being engageable against a movable partition forming element to move the same.

11. The structure described in claim 9 and including resilient means for normally urging said movable partition forming elements into staggered relation to said fixed partition forming elements.

12. An egg lifter including a generally rectangular frame having fixed partition forming elements extending in parallel fixed relation secured to opposite sides thereof, a series of movably supported partition forming elements supported by said opposite sides in parallel relation to said fixed partition forming elements and at a lower elevation with respect thereto, said movable partition forming elements being connected in pairs for movement in unison, a means for moving each pair of movable partition forming elements, said last named means including an inverted U-shaped lever having the opposite sides thereof connected to said opposite sides of said frame along aligned pivots, the ends of said lever sides engaging against a corresponding movable partition forming element for moving the same, and means for connecting the means for actuating the movable partition forming elements, said connecting means actuating all of said means and actuating said movable partition forming elements in unison when one of the same is actuated but permitting independent pivotal movement of the other pivoted levers.

13. An egg lifter comprising a frame, a series of fixed upper partition elements secured to opposite sides of said frame, a series of movable partition elements spaced in parallel relation beneath said upper partition elements, the opposite sides of said frame having a series of laterally extending slots for the reception of the ends of said lower partition elements, said slots each having one end beneath the ends of said upper partition elements and having the other end intermediate adjacent upper elements whereby said lower partition elements may be move from a vertically aligned position with respect to said upper partition elements to a staggered position with respect thereto, and means for moving said lower elements from said vertically aligned position to said staggered position.

HUGH K. SCHILLING.

References Cited in the file of this patent
UNITED STATES PATENTS

| Number | Name | Date |
|---|---|---|
| 1,203,938 | Terrio | Nov. 7, 1916 |
| 1,509,477 | Kasser | Sept. 23, 1924 |
| 2,131,446 | Lowenstein | Sept. 27, 1938 |
| 2,178,525 | Taylor | Oct. 31, 1939 |
| 2,248,643 | Thomas et al. | July 8, 1941 |
| 2,281,730 | Thompson | May 5, 1942 |
| 2,370,122 | Bramson | Feb. 27, 1945 |